United States Patent
Nagao et al.

(10) Patent No.: US 11,341,599 B2
(45) Date of Patent: May 24, 2022

(54) IMAGE PROCESSING APPARATUS, IMAGE PROCESSING METHOD, AND COMPUTER READABLE MEDIUM STORING IMAGE PROCESSING PROGRAM

(71) Applicants: FUJIFILM BUSINESS INNOVATION CORP., Tokyo (JP); FUJIFILM Corporation, Tokyo (JP)

(72) Inventors: Takashi Nagao, Ashigarakami-gun (JP); Kazuyuki Itagaki, Ashigarakami-gun (JP)

(73) Assignees: FUJIFILM Business Innovation Corp., Tokyo (JP); FUJIFILM CORPORATION, Tokyo (JP)

(*) Notice: Subject to any disclaimer, the term of this patent is extended or adjusted under 35 U.S.C. 154(b) by 0 days.

(21) Appl. No.: 16/676,549

(22) Filed: Nov. 7, 2019

(65) Prior Publication Data

US 2020/0074584 A1 Mar. 5, 2020

Related U.S. Application Data

(63) Continuation of application No. PCT/JP2018/005135, filed on Feb. 14, 2018.

(30) Foreign Application Priority Data

Sep. 15, 2017 (JP) .............................. JP2017-177465

(51) Int. Cl.
*G06T 1/20* (2006.01)
*G06F 9/48* (2006.01)
(Continued)

(52) U.S. Cl.
CPC .............. *G06T 1/20* (2013.01); *G06F 9/4843* (2013.01); *G06F 9/52* (2013.01)

(58) Field of Classification Search
CPC ........... G06F 2209/5017; G06F 9/4843; G06F 9/5038; G06F 9/52; G06T 1/20
See application file for complete search history.

(56) References Cited

U.S. PATENT DOCUMENTS

| | | | |
|---|---|---|---|
| 6,378,066 B1 | 4/2002 | Lewis | |
| 7,525,547 B1 * | 4/2009 | Diard | ........................ G06T 1/20 345/502 |

(Continued)

FOREIGN PATENT DOCUMENTS

| | | |
|---|---|---|
| JP | 2000-285084 A | 10/2000 |
| JP | 2008-181386 A | 8/2008 |

(Continued)

OTHER PUBLICATIONS

Gautam, Susheel et al., "The OpenVX™ Specification", [online], [retrieved on Aug. 31, 1999], and internet <URL: <https://www.khronos.org/registry/vx/specs/1.0.1/OpenVX_Specification_1_0_1.pdf>.

(Continued)

*Primary Examiner* — Sing-Wai Wu
(74) *Attorney, Agent, or Firm* — Oliff PLC

(57) ABSTRACT

An image processing apparatus in which image processing is executed by each of objects of an object group in which the objects each executing the image processing are connected to one another in a directed acyclic graph form, includes: a division portion that divides image data, which is a target of the image processing, into plural first divided image data pieces when the image processing is processing having sequentiality in processing sequence; and a control portion that makes control to enable computing devices to (Continued)

execute first partial processings in parallel, the first partial processings being pieces of the image processing to be performed on the first divided image data pieces and being allowed to be processed in accordance with dependent relations with front and rear stages and a processing sequence dependent relation.

20 Claims, 12 Drawing Sheets

(51) Int. Cl.
*G06F 9/52* (2006.01)
*G06F 9/50* (2006.01)

(56) References Cited

U.S. PATENT DOCUMENTS

| | | | |
|---|---|---|---|
| 8,437,805 B2* | 5/2013 | Bylsma | G06T 3/606 |
| | | | 455/566 |
| 2002/0157086 A1 | 10/2002 | Lewis et al. | |
| 2002/0162089 A1 | 10/2002 | Lewis et al. | |
| 2004/0015929 A1 | 1/2004 | Lewis et al. | |
| 2006/0206869 A1 | 9/2006 | Lewis et al. | |
| 2008/0183792 A1 | 7/2008 | Inoue | |
| 2009/0135190 A1* | 5/2009 | Bakalash | G06T 1/60 |
| | | | 345/506 |
| 2012/0050815 A1* | 3/2012 | Kodama | H04N 1/4052 |
| | | | 358/3.03 |
| 2017/0302815 A1* | 10/2017 | Nakayama | G06T 1/60 |

FOREIGN PATENT DOCUMENTS

| | | |
|---|---|---|
| JP | 2009-054001 A | 3/2009 |
| JP | 2009-54003 A | 3/2009 |
| JP | 2009-295163 A | 12/2009 |
| JP | 4965995 B2 | 7/2012 |

OTHER PUBLICATIONS

Belyakov, Igor et al., "Deferred Mode Image Processing Framework: Simple and Efficient Use of Intel Multi-Core Technology and Many-Core Architectures with Intel Integrated Performance Primitives", [online], [retrieved on Aug. 31, 1999], and internet <URL: http://www.isus.jp/article/library-special/deferred-mode-image-processing-framework/>.

May 15, 2018 Search Report issued in International Patent Application No. PCT/JP2018/005135.

May 15, 2018 Written Opinion issued in International Patent Application No. PCT/JP2018/005135.

Jan. 5, 2021 Office Action issued in Japanese Patent Application No. 2019-541623.

* cited by examiner

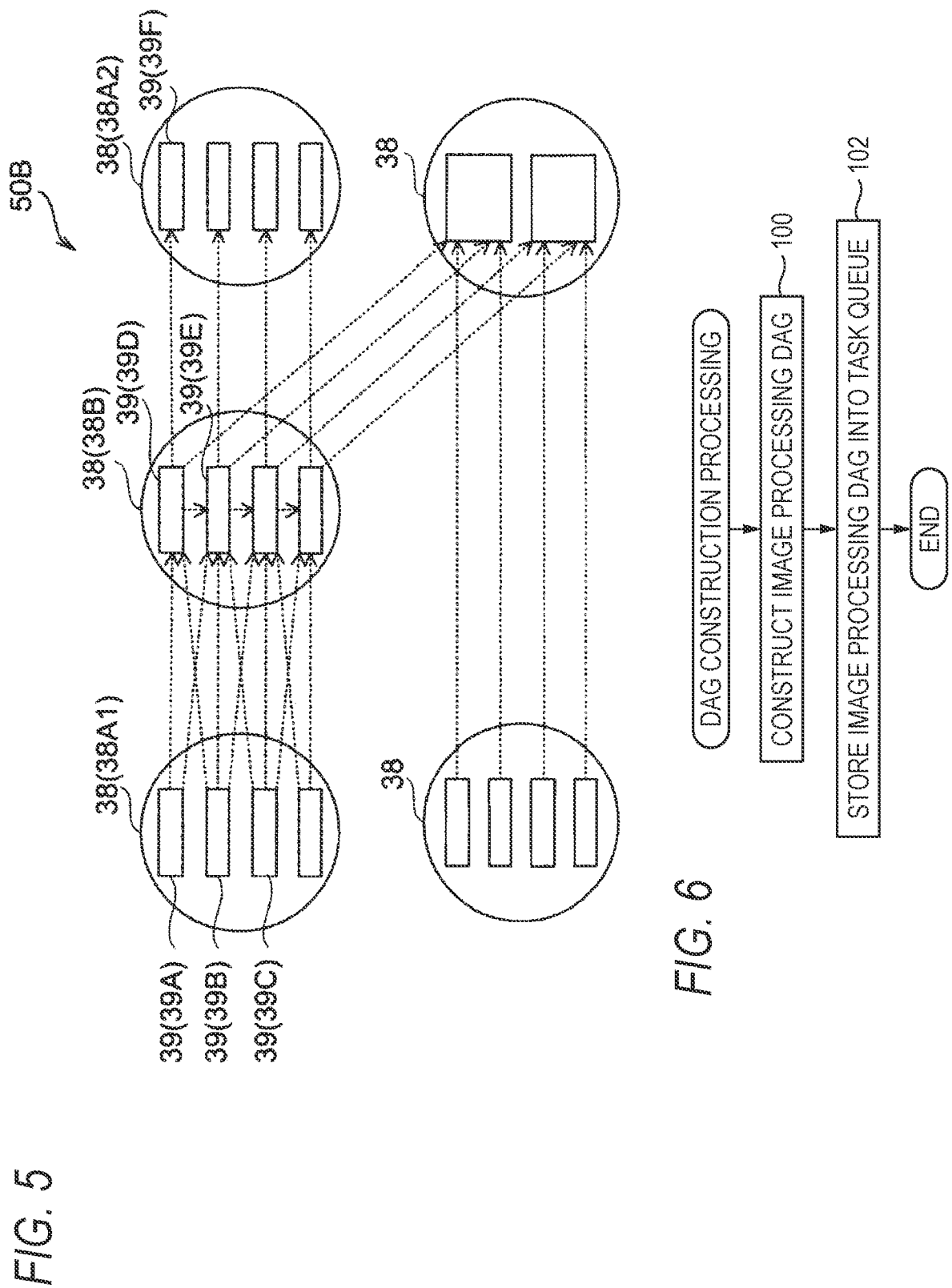

IMAGE PROCESSING APPARATUS, IMAGE PROCESSING METHOD, AND COMPUTER READABLE MEDIUM STORING IMAGE PROCESSING PROGRAM

CROSS-REFERENCE TO RELATED APPLICATIONS

This is a continuation of International Application No. PCT/JP2018/005135 filed on Feb. 14, 2018, and claims priority from Japanese Patent Application No. 2017-177465 filed on Sep. 15, 2017.

BACKGROUND

1. Technical Field

The present disclosure relates to an image processing apparatus, an image processing method, and a computer readable medium storing an image processing program.

2. Related Art

An information processing apparatus has been disclosed in PTL 1. The information processing apparatus converts a graph structure expressing a combination of program modules into a graph structure in which nodes are divided in accordance with divided input data pieces, and parallel processing is applied to, of the nodes in the converted graph structure, the nodes whose preceding nodes have been processed.

In addition, a technique performing image processings in parallel in accordance with an execution sequence of the image processings expressed by a DAG (Directed Acyclic Graph) has been disclosed in NPL 1 and NPL 2.

PTL 1: Japanese Patent No. 4965995
NPL 1: Deferred Mode Image Processing Framework, [online], [searched on Aug. 31, 2017], Internet <URL: http://www.isus.jp/article/library-special/deferred-mode-image-processing-framework/>
NPL 2: The OpenVX Specification, [online], [searched on Aug. 31, 2017], Internet <URL: https://www.khronos.org/registry/vx/specs/1.0.1/OpenVX_Specification_1_0_1.pdf>

SUMMARY

There is a case where partial processings based on the image processings are executed in parallel by a plurality of computing devices. In this case, when some image processings having sequentiality in processing sequence are handled as one partial processing, the operation efficiency of the computing devices may be lowered to elongate the total time of the image processings expressed by the directed acyclic graph form.

Aspects of non-limiting embodiments of the present disclosure relate to provide an image processing apparatus, an image processing method and an image processing program, by which a total image processing time for image processings expressed in a directed acyclic graph form can be shortened in comparison with that in a case where image processings having sequentiality in processing sequence are handled as one partial processing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus in which image processing is executed by each of objects of an object group in which the objects each executing the image processing are connected to one another in a directed acyclic graph form, the apparatus comprising: a division portion that divides image data, which is a target of the image processing, into a plurality of first divided image data pieces when the image processing is processing having sequentiality in processing sequence; and a control portion that makes control to enable computing devices to execute first partial processings in parallel, the first partial processings being pieces of the image processing to be performed on the first divided image data pieces and being allowed to be processed in accordance with dependent relations with front and rear stages and a processing sequence dependent relation.

BRIEF DESCRIPTION OF THE DRAWINGS

Exemplary embodiments of the present invention will be described in detail based on the following figures, wherein:

FIG. 5 is a schematic view showing an example of the image processing DAG in which each of image processing modules has been divided into partial processings (tasks);

FIG. 6 is a flow chart showing an example of a flow of DAG construction processing in the first exemplary embodiment;

DETAILED DESCRIPTION

Exemplary embodiments of the present invention will be described below in detail by way of example with reference to the drawings.

First Exemplary Embodiment

First, the configuration of a computer 10 functioning as an image processing apparatus will be described with reference to FIG. 1. Incidentally, the computer 10 may be a computer incorporated into an image handling machine which performs image processing internally, such as a copying machine, a printer, a facsimile apparatus, a multifunctional machine provided with the functions of these apparatuses, or a scanner. In addition, the computer 10 may be an independent computer such as a PC (Personal Computer), or may be a computer incorporated into a portable machine such as a PDA (Personal Digital Assistant) or a mobile phone.

Figure 1:
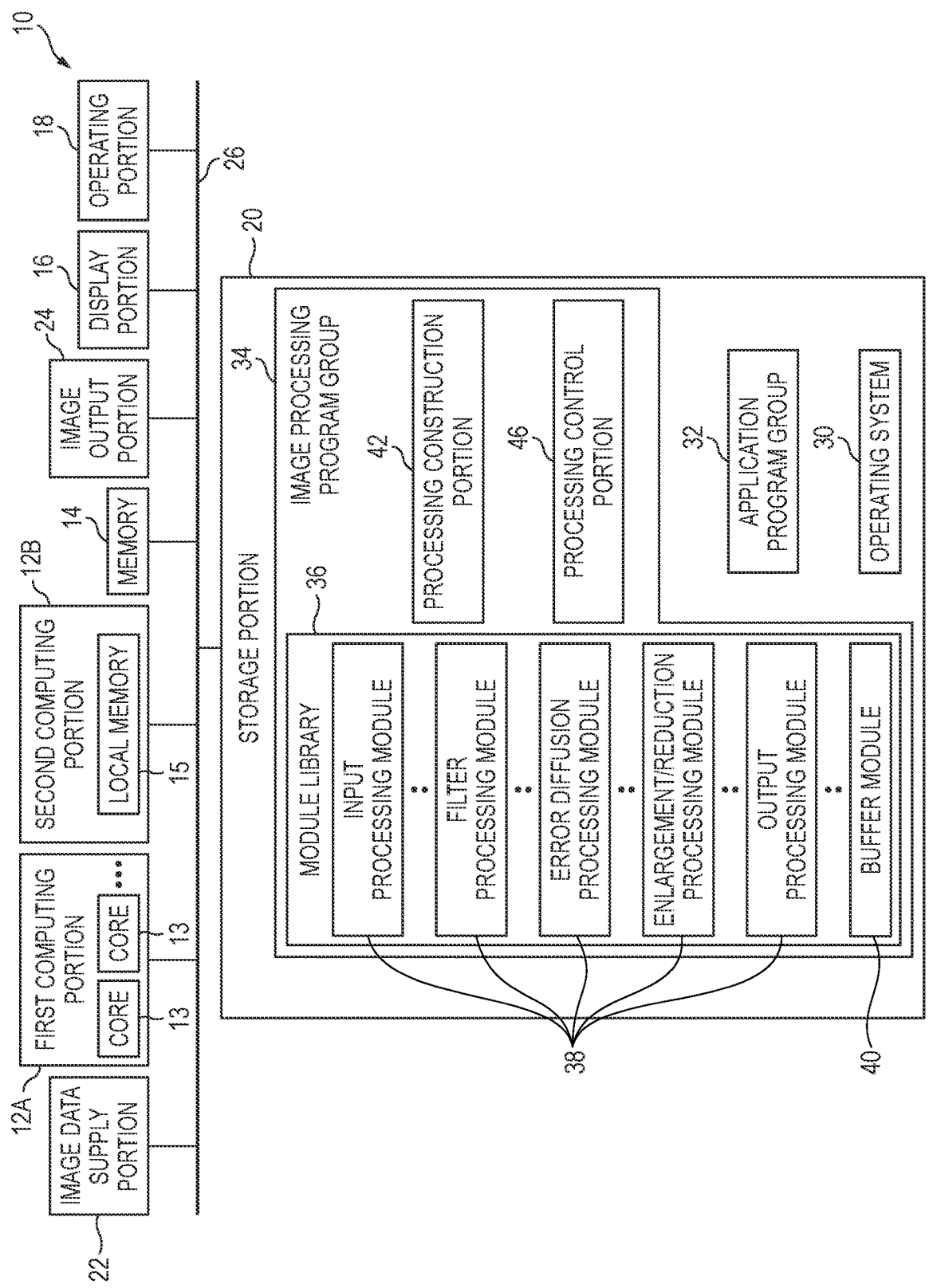
FIG. 1 is a block diagram showing an example of the configuration of a computer functioning as an image processing apparatus in a first exemplary embodiment.

As shown in FIG. 1, the computer 10 in the present exemplary embodiment is provided with a first computing portion 12A, a second computing portion 12B, a memory 14, a display portion 16, an operating portion 18, a storage portion 20, an image data supply portion 22, and an image output portion 24. In addition, the first computing portion 12A, the second computing portion 12B, the memory 14, the display portion 16, the operating portion 18, the storage portion 20, the image data supply portion 22, and the image output portion 24 are connected to one another through a bus 26.

The first computing portion 12A in the present exemplary embodiment is a main processor of the computer 10. For example, the first computing portion 12A is a CPU (Central Processing Unit) having a plurality of processor cores 13 (hereinafter referred to as "cores 13"). In the following description, each of the cores 13 may be described in a distinguishable manner in which the core is referred to by the sign suffixed with an alphabetical character, such as a core 13A or a core 13B.

In addition, the second computing portion 12B in the present exemplary embodiment is, for example, a GPU (Graphics Processing Unit) having a local memory 15 internally. Incidentally, the second computing portion 12B is not limited particularly as long as it is a computing device provided with an internal memory such as the local memory 15 to perform image processing on image data stored in the internal memory. For example, the second computing portion 12B may be a CPU. In addition, the second computing portion 12B may be a GPU built in the first computing portion 12A. In addition, the first computing portion 12A and the second computing portion 12B may be computing devices such as FPGAs (Field Programmable Gate Arrays). The cores 13 and the second computing portion 12B in the present exemplary embodiment are an example of computing devices in the present disclosure.

The memory 14 is a non-volatile storage unit into which the first computing portion 12A temporarily stores data. When image processing is performed by the second computing portion 12B in the present exemplary embodiment, the first computing portion 12A transfers image data stored in a storage area of the memory 14 or the storage portion 20 to the second computing portion 12B through the bus 26. The second computing portion 12B stores the image data transferred from the first computing portion 12A into the local memory 15, and performs the image processing on the stored image data.

When the computer 10 is incorporated into the aforementioned image handling machine, for example, a display panel such as an LCD (Liquid Crystal Display) and a numeric keypad etc. which are provided in the image handling machine may be applied as the display portion 16 and the operating portion 18 respectively. In addition, when the computer 10 is an independent computer, for example, a display and a keyboard, a mouse, or the like, which are connected to the computer 10 may be applied as the display portion 16 and the operating portion 18 respectively. In addition, the display portion 16 and the operating portion 18 may be a touch panel display etc. in which a touch panel and a display are configured integrally. In addition, a non-volatile storage medium such as an HDD (Hard Disk Drive), an SSD (Solid State Drive) or a flash memory may be applied as the storage portion 20.

Any portion may be used as the image data supply portion 22 as long as it can supply processing target image data. For example, an image reading portion which reads an image already recorded on a recording material such as a sheet of paper or a photographic film, and outputs data of the image may be applied as the image data supply portion 22. In addition, for example, a reception portion which receives image data from an external device through a communication line, and an image storage portion (the memory 14 or the storage portion 20) etc. which stores the image data may be applied as the image data supply portion 22.

Any portion may be used as the image output portion 24 as long as it can output image data already subjected to image processing or an image represented by the image data already subjected to the image processing. For example, an image recording portion which records the image represented by the image data onto a recording material such as a sheet of paper or a photosensitive material may be applied as the image output portion 24. In addition, a display portion (the display portion 16) which displays the image represented by the image data on a display etc. or a writing device which writes the image data onto a recording medium such as a CD-ROM (Compact Disk Read Only Memory) may be applied as the image output portion 24. In addition, a transmission portion which transmits the image data already subjected to the image processing to an external device through a communication line may be applied as the image output portion 24. In addition, the image output portion 24 may be an image storage portion (the memory 14 or the storage portion 20) which stores the image data already subjected to the image processing.

As shown in FIG. 1, various programs to be executed by the first computing portion 12A and the second computing portion 12B are stored in the storage portion 20. Programs of an operating system 30 performing management of resources, management of execution of each program, communication between the computer 10 and each external device, etc. are stored as the various programs in the storage portion 20. In addition, a group of image processing programs 34 which enables the computer 10 to function as an image processing apparatus is stored as the various programs in the storage portion 20. In addition, a group of various application programs 32 (hereinafter referred to as "application 32") which enables the aforementioned image processing apparatus to perform desired image processing is stored as the various programs in the storage portion 20.

The group of image processing programs 34 is programs developed in order to lighten a load for developing the image processing programs to be executed by the image handling machine, the portable machine, the PC, etc. which have been described above. In addition, the group of image processing programs 34 is the programs developed executably in common among various machines (platforms) such as the image handling machine, the portable machine, the PC, etc. which have been described above.

The image processing apparatus implemented by the group of image processing programs 34 constructs an image processing DAG (Directed Acyclic Graph) 50A (which will be described in detail) performing image processing instructed by the application 32 in accordance with a construction instruction from the application 32. The aforementioned image processing apparatus executes processing of the image processing DAG 50A in accordance with an execution instruction from the application 32. Therefore, the group of image processing programs 34 provides, to the application 32, an interface for instructing the construction of the image processing DAG 50A performing desired image processing or for instructing the constructed image processing DAG 50A to execute the image processing.

Due to the aforementioned configuration, when a device for performing image processing internally is newly developed, only the application 32 for causing the group of image processing programs 34 to perform image processing by using the interface may be developed for developing a program portion for performing image processing. Accordingly, a developer does not have to newly develop the programs for performing the image processing actually. Thus, a load on the developer may be lightened.

Next, the group of image processing programs 34 in the present exemplary embodiment will be described in detail. As shown in FIG. 1, the group of image processing programs 34 includes a module library 36, a program of a processing construction portion 42, and a program of a processing control portion 46.

Programs of image processing modules 38 performing predetermined image processings different from one another are registered individually in the module library 36. For example, input processing, filter processing, error diffusion processing, enlargement or reduction processing (denoted as "enlargement/reduction processing" in FIG. 1), color conversion processing, skew angle detection processing, image rotation processing, image combination processing, output processing, etc. (respective processing modules for the input processing, the filter processing, the error diffusion processing, the enlargement/reduction processing and the output processing are described in FIG. 1) are listed as the image processings.

Incidentally, image processing modules 38 the same in kind of image processing but different in contents of the image processing to be executed may be also registered in the module library 36. For example, two image processing modules 38 performing enlargement or reduction processing may be registered. That is, one is an image processing module 38 performing reduction processing to thin out inputted image data every two pixels in each of a horizontal direction and a vertical direction so as to reduce the length and the width of an image to 50%, and the other is an image processing module 38 performing enlargement or reduction processing at a designated enlargement or reduction.

In addition, a buffer module 40 provided with a storage area (buffer) for storing the image data is also registered in the module library 36.

The processing construction portion 42 in the present exemplary embodiment constructs an image processing DAG 50A in a DAG form in accordance with an instruction from the application 32. For example, as shown in FIG. 2A, one or more image processing modules 38 are connected through the buffer module 40 disposed in at least one of a front stage and a rear stage of each of the image processing modules 38 in the image processing DAG 50A.

Incidentally, each of the image processing modules 38 is an example of an object executing image processing on input image data. In addition, the example illustrated in FIG. 2A shows that one image processing module 38 to which another image processing module 38 in a front stage is connected through the buffer module 40 can execute its own image processing when image processing performed by the front-stage image processing module 38 has been completed. In addition, it shows that the image processing module 38 to which a plurality of image processing modules 38 in the front stage are connected through the buffer module 40 can execute its own image processing when, of image processings of the front-stage image processing modules 38, all the image processings required as inputs for the processing of the image processing module 38 itself have been completed.

Figure 2A:
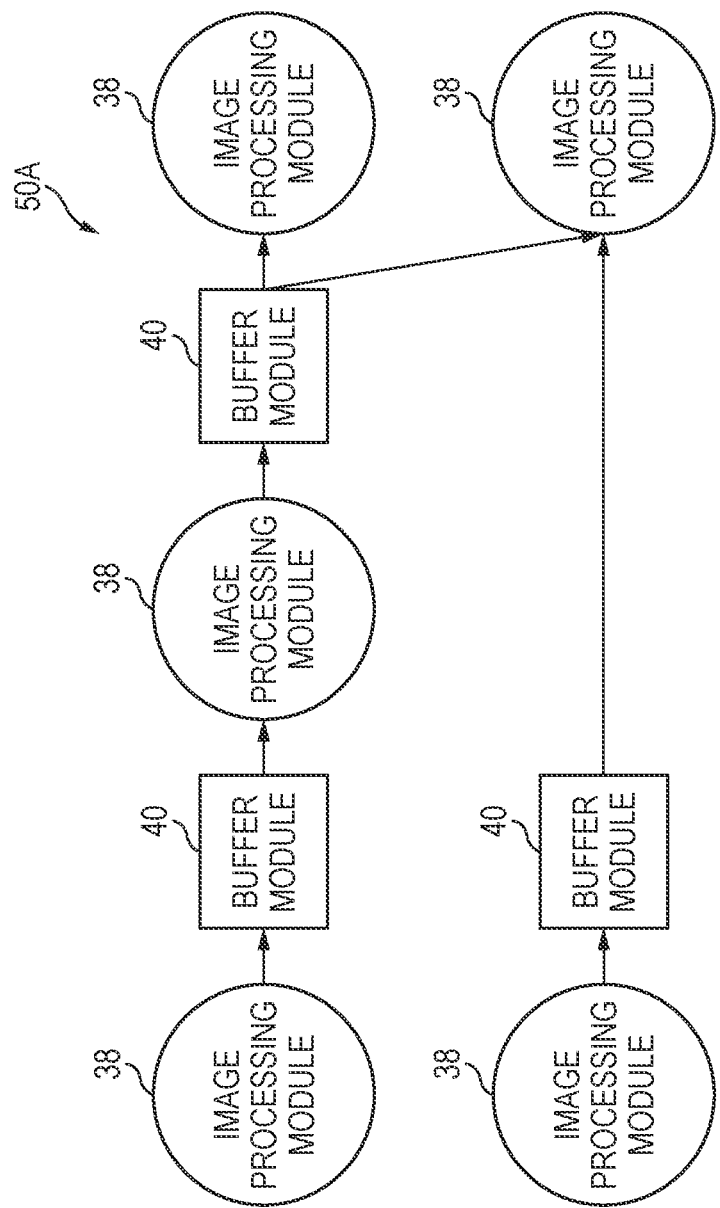
FIG. 2A is a schematic view showing an example of an image processing DAG.
Figure 2B:
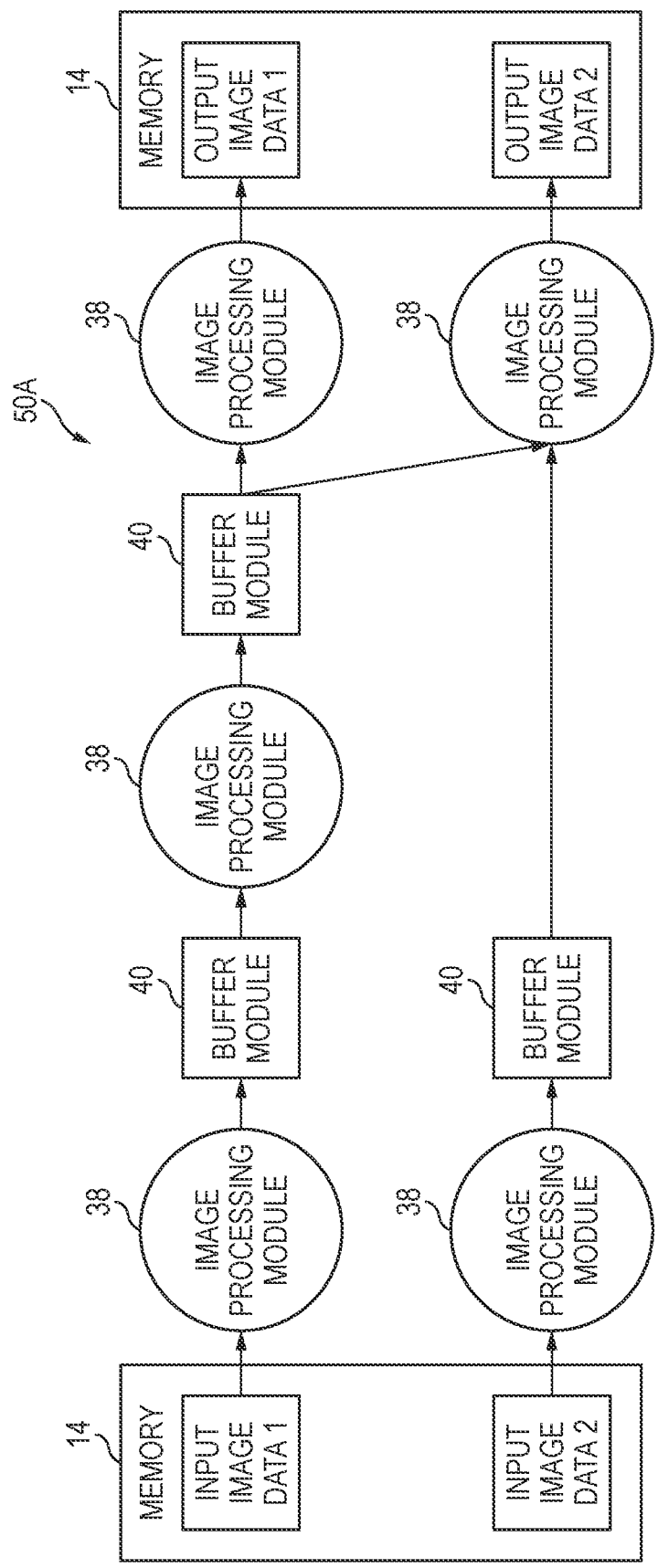
FIG. 2B is a schematic view showing an example of a case where an input/output memory is added to the image processing DAG.

In addition, the DAG in which only the respective modules are connected in a processing sequence is shown in FIG. 2A. In execution of the DAG, input image data stored in the memory 14 are inputted, and image processings are then performed on the input image data in accordance with the DAG, as shown in FIG. 2B. Processing results of processed output image data etc. are finally stored in the memory 14.

Figure 3:
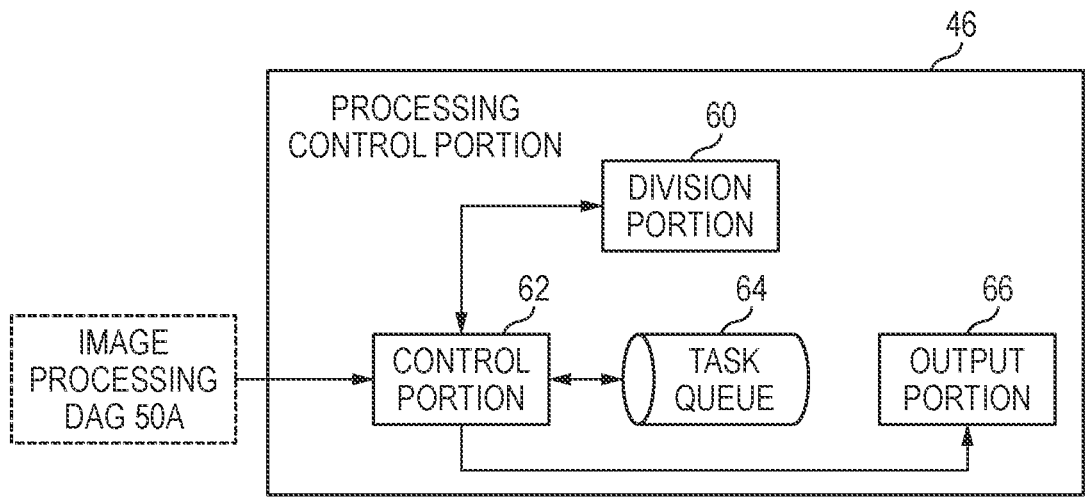
FIG. 3 is a block diagram showing an example of the functional configuration of a processing control portion in the first exemplary embodiment.

Next, the functional configuration of the processing control portion 46 in the present exemplary embodiment will be described with reference to FIG. 3. As shown in FIG. 3, the processing control portion 46 is provided with a division portion 60, a control portion 62, a task queue 64, and an output portion 66.

Figure 4A:
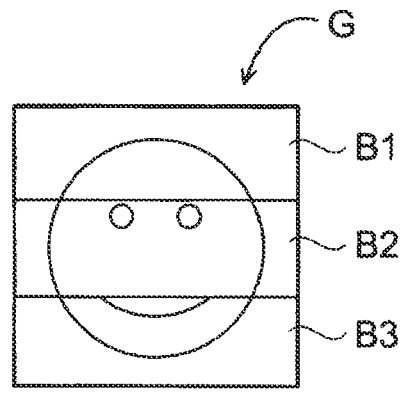
FIG. 4A is a schematic view provided for explanation of an example of division processing of an input image in the first exemplary embodiment.

The division portion 60 in the present exemplary embodiment divides an image represented by a processing target part of input image data, into a plurality of partial regions (hereinafter referred to as "divided images"). For example, as shown in FIG. 4A, the division portion 60 divides an image G represented by a processing target part of input image data, into a plurality of (three in the example shown in FIG. 4A) divided images B1 to B3. Incidentally, the image data representing the divided images will be hereinafter referred to as "divided image data pieces". In addition, the processing target part of the input image data means a part in which the whole of the input image data is used as the processing target in image processing such as color conversion processing, which uses the whole of an input image as the processing target. In addition, the processing target part of the input image data means a part of an input image in image processing such as clipping (trimming) processing, which uses the part of the input image data as the processing target. In order to avoid complication, the processing target part of the input image data will be hereinafter simply referred to as "input image data".

Figure 4B:
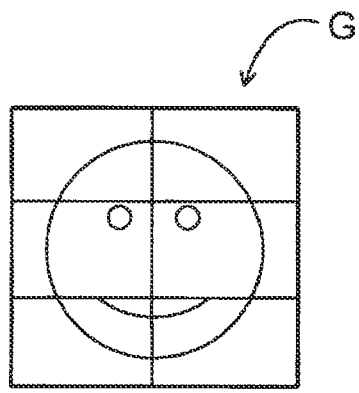
FIG. 4B is a schematic view provided for explanation of an example of the division processing of the input image in the first exemplary embodiment.

In addition, the division portion 60 divides the image G in an up/down direction in front view in the example shown in FIG. 4A. However, how the division portion 60 divides the image G is not limited thereto. For example, the division portion 60 may divide the image G in a left/right direction in front view, or may divide the image G in the up/down direction and the left/right direction in front view, as shown in FIG. 4B.

Incidentally, the number of parts of the input image data divided by the division portion 60 is not limited particularly. For example, the division portion 60 may divide the input image data by a predetermined number or size. In addition, for example, the division portion 60 may divide the input image data into the parts whose number is not larger than the number of the processor cores belonging to the computing portion executing the image processings using the image processing modules 38, and not smaller than 2.

In addition, for example, the division portion 60 may divide the input image data by a size not larger than capacity of a cache memory belonging to the computing portion executing the image processings using the image processing modules 38. In this case, for example, according to one form, the division portion 60 divides the input image data by a size which is not larger than capacity of a large-capacity level cache memory, i.e. a so-called LCC (Last Level Cache) attached to the processors of the computing portion executing the image processings by the image processing modules 38, and which coincides with the capacity of the LLC as closely as possible.

The division portion 60 in the present exemplary embodiment performs control on the plurality of cores 13 to execute tasks corresponding to divided image data pieces in parallel. Incidentally, the expression "in parallel" mentioned herein means that the tasks which can be executed based dependent relations are executed by the plurality of cores 13 in parallel (simultaneously).

Specifically, the division portion 60 divides the image processing to be executed by each of the image processing modules 38 of the image processing DAG 50A, into partial processings 39 corresponding to the divided image data pieces respectively so as to update the image processing DAG 50A to an image processing DAG 50B, as shown in FIG. 5 as an example. Incidentally, the image processing DAG 50B expresses a DAG in the tasks of the respective partial processings 39, i.e. a so-called task DAG.

Incidentally, FIG. 5 shows the image processing DAG 50B in a case where the input image data in the image processing DAG 50A shown in FIG. 2A is divided into four divided image data pieces. In FIG. 5, illustration of the buffer module 40 is omitted in order to avoid complication.

The division portion 60 in the present exemplary embodiment gives dependent relations among the partial processings 39 in accordance with kinds of the image processings executed by the image processing modules 38. Incidentally, the dependent relations are expressed by arrows of broken lines in FIG. 5.

Here, the image processings in the present exemplary embodiment will be described. The image processings in the present exemplary embodiment are classified into two kinds of image processings, i.e. image processing which has sequentiality in processing sequence, and image processing which has no sequentiality in processing sequence.

When, for example, the image processing is error diffusion processing for binarizing each pixel value (0 to 255) consisting of 8 bits to 0 or 255, it is necessary to propagate a binarization error caused by the image processing up to a pixel preceding in processing sequence to a processing target pixel in order to perform the image processing on a pixel value of the processing target pixel.

In addition, for example, assume that the image processing is image input processing or image output processing with an external storage device such as a hard disk. In this case, the hard disk where image files are stored is one physical medium. Accordingly, when data are read/written from/into the hard disk by a plurality of computing devices etc. in parallel, the order of the data may be disturbed so that the data cannot be read or written correctly.

In the present exemplary embodiment, image processing such as error diffusion processing which is not independent for each pixel, or image processing such as image input processing or image output processing in which parts of the image processing on the divided images have to be performed sequentially in chronological order will be referred to as image processing which has sequentiality in processing sequence, and hereinafter simply referred to as image processing having sequentiality. Incidentally, each of the partial processings 39 in the image processing having sequentiality in the present disclosure is an example of first partial processing in the present disclosure. A divided image data piece of the partial processing 39 is an example of a first divided image data piece in the present disclosure.

On the other hand, in image processing such as color conversion processing, or conversion processing in which each of pixel values of an image is converted by use of a conversion table such as an LUT (Lookup Table), the image processing is performed on only each processing target pixel. In this case, the image processing is independent for each pixel so that a pixel value of one pixel is not affected by a pixel value of another pixel.

In addition, in image processing such as convolutional filter processing which refers to peripheral pixels of a processing target pixel, processing on the processing target pixel has a dependent relation to front-stage partial processing 39 performing image processing on the peripheral pixels, but the filter processing per se may be performed independently for each pixel.

In the present exemplary embodiment, the image processing independent for each pixel will be thus referred to as image processing which has no sequentiality in processing sequence, and hereinafter simply referred to as image processing having no sequentiality. Incidentally, the partial processing 39 in the image processing having no sequentiality in the present disclosure is an example of second partial processing in the present disclosure, and a divided image data piece of the partial processing 39 is an example of a second divided image data piece in the present disclosure.

Incidentally, whether the image processing has sequentiality or not depends on processing contents of each of the image processing modules 38. Accordingly, the present exemplary embodiment has a form in which information (hereinafter referred to as "sequentiality information") indicating whether the image processing has sequentiality or not is held in advance by the image processing module 38. Incidentally, the form also includes at least one of a form in which information indicating that the image processing has sequentiality is held in advance by the image processing module 38 performing the image processing having sequentiality, and a form in which information indicating that the image processing has no sequentiality is held in advance by the image processing module 38 performing the image processing having no sequentiality. In addition, the form is not limited to the present exemplary embodiment but may be a form in which, for example, sequentiality information is outputted from each of the image processing modules 38 regardless of whether the image processing module 38 holds the sequentiality information or not.

For an image processing module 38B performing image processing having sequentiality, the division portion 60 divides an image into divided images (partial processings 39), and gives a processing sequence dependent relation among the divided partial processings 39 (see arrows among the partial processings 39 in the image processing module 38B in FIG. 5).

In addition, for an image processing module 38A performing image processing having no sequentiality and the image processing module 38B performing the image processing having sequentiality, the division portion 60 gives dependent relations (see arrows between the image processing modules 38 in FIG. 5) between partial processings 39 of an image processing module 38 connected in a front stage, and partial processings 39 of an image processing module 38 connected in a rear stage.

Specifically, in the case shown in FIG. 5, partial processing 39A, partial processing 39B and partial processing 39C of an image processing module 38A1 can be executed individually when execution of image processing starts. On the other hand, partial processing 39D of the image processing module 38B can be executed when both the partial processing 39A and the partial processing 39B given dependent relations with the partial processing 39D have been completed. In addition, partial processing 39E of the image processing module 38B can be executed when all the partial processing 39A, the partial processing 39B, the partial processing 39C and the partial processing 39D given dependent relations with the partial processing 39E have been completed. Further, partial processing 39F of an image processing module 38A2 can be executed when the partial processing 39D given a dependent relation with the partial processing 39F has been completed.

That is, each of the partial processings 39 can be executed when another partial processing 39 given a dependent relation with the partial processing 39 is not present as pro-processing, or when all partial processings 39 as pro-processings given dependent relations with the partial processing 39 have been completed.

Incidentally, the partial processing 39 corresponding to the divided image data piece will be hereinafter also referred to as "task".

The control portion 62 in the present exemplary embodiment stores executable tasks into a task queue 64 so that each of the cores 13 can sequentially extract and execute the stored tasks. Incidentally, the number of the tasks simultaneously stored in the task queue 64 is not limited to that in the present exemplary embodiment. However, the number of the tasks is preferably two or more, more preferably a number corresponding to the number of the computing devices (the cores 13 etc.) etc. Assume that a new task cannot be stored into the task queue 64 unless execution of a task is completed in a case where the number of tasks allowed to be stored in the task queue 64 is small. In this case, the new task cannot be stored in the task queue 64, thereby leading to an increase of the number of idle ones of the cores 13. As a result, an operating rate of the cores 13 is lowered. Incidentally, when the number of tasks which can be stored simultaneously in the task queue 64 is not limited, a memory is secured for all the tasks stored in the task queue 64 in pre-processing (details will be given later). Accordingly, capacity of the secured memory increases.

Therefore, an increase of the quantity of resources such as the memory secured in the pre-processing may be suppressed by limiting the number of tasks allowed to be stored simultaneously by the task queue 64. Therefore, the number of the tasks allowed to be simultaneously stored by the task queue 64 may be determined according to the capacity etc. of the memory, or may be variable according to the operating rate of the cores 13.

The control portion 62 acquires a task from the task queue 64 and executes the acquired task.

The output portion 66 in the present exemplary embodiment is controlled by the control portion 62 to output image data obtained as a result of image processing executed by a final-stage image processing module 38 of the image processing DAG 50B. In this present exemplary embodiment, the output portion 66 displays, on the display portion 16, an output image represented by the obtained output image data. Incidentally, the output portion 66 may output (transmit) the output image data to an external device. In addition, when the computer 10 is incorporated into a printer, the output portion 66 may output (form) the output image represented by the output image data, onto a recording material such as a sheet of paper.

Next, effects of the computer 10 in the present exemplary embodiment will be described with reference to FIG. 6 to FIG. 10. Incidentally, FIG. 6 is a flow chart showing an example of a flow of DAG construction or execution processing executed by the first computing portion 12A as soon as an instruction to start execution of image processing is inputted by the application 32. In addition, a program for the DAG construction or execution processing is installed in advance in the storage portion 20. In addition, the cores 13 which are not engaging in any tasks in the first computing portion 12A but can execute tasks execute the DAG construction or execution processing program to thereby function as the aforementioned processing construction portion 42 and the aforementioned control portion 62.

In a step 100 in FIG. 6, the processing construction portion 42 constructs an image processing DAG 50A for performing image processings instructed by the application 32, in accordance with the construction instruction of the application 32. In a next step 102, the control portion 62 stores tasks into the task queue 64. The tasks are performed to execute update processing of the image processing DAG 50A constructed in the step 100 and dependent relation giving processing for each of image processing modules 38. Then, the present DAG construction processing is completed.

In the present exemplary embodiment, each of the aforementioned tasks stored in the task queue 64 is extracted and executed by one of the cores 13. Thus, the DAG update processing shown by way of example in FIG. 7 is executed.

Figure 7:
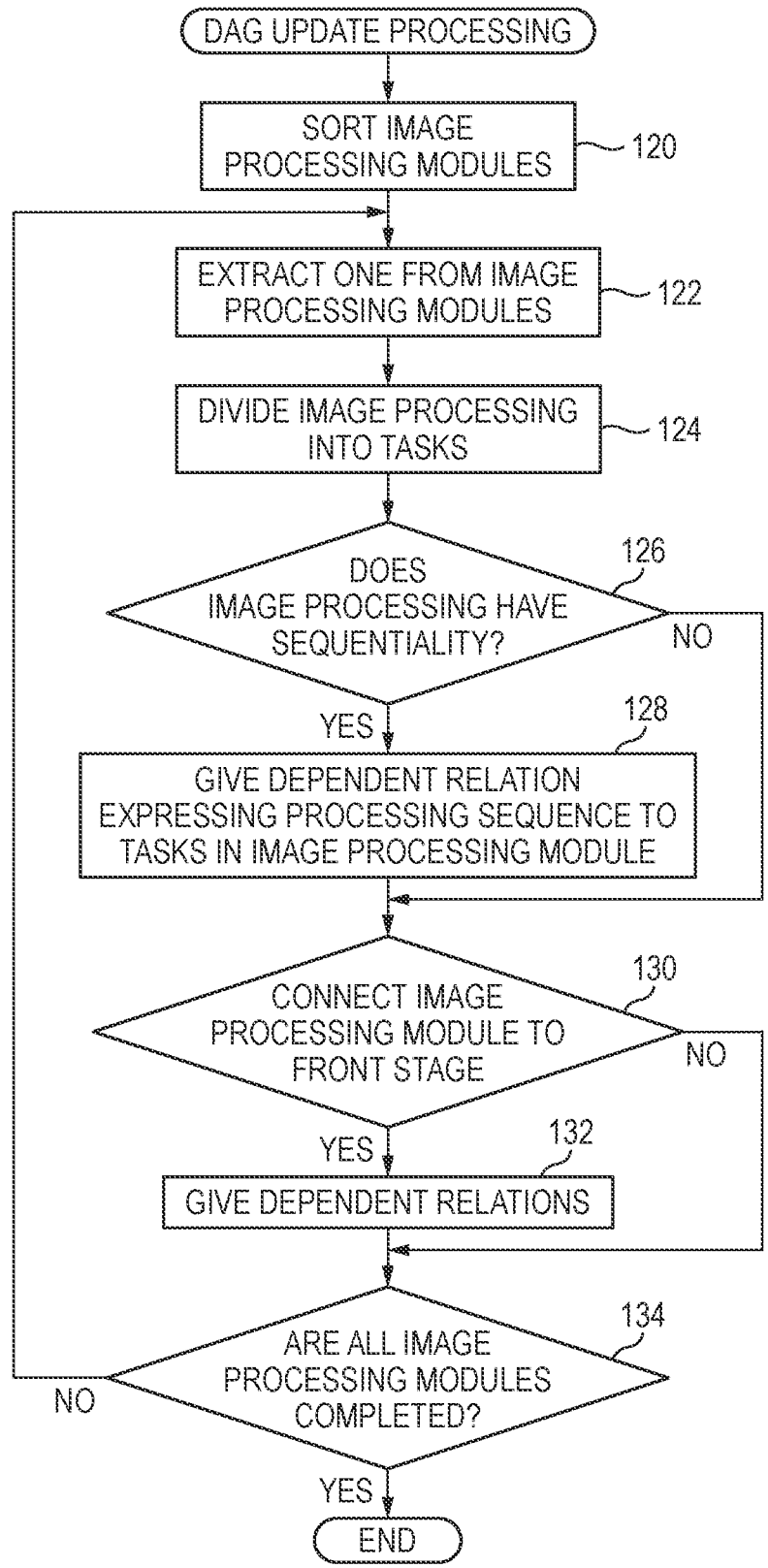
FIG. 7 is a flow chart showing an example of a flow of DAG update processing in the first exemplary embodiment.

Incidentally, FIG. 7 is a flow chart showing a flow of processing of a DAG update processing program. The DAG update processing program is also installed in advance in the storage portion 20. In addition, the cores 13 which can execute the tasks execute the DAG update processing program to thereby function as the aforementioned division portion 60 and the aforementioned control portion 62.

In a step 120 in FIG. 7, the division portion 60 sorts all the image processing modules 38 included in the image processing DAG 50A by a known sorting technique such as topological sorting.

In a next step 122, the division portion 60 extracts one image processing module 38 as a processing target sequentially from top to bottom from all the image processing modules 38 sorted by the aforementioned step 120.

In a step 124, the division portion 60 divides input image data into a plurality of divided image data parts, as described above. As described above, the division portion 60 divides the image processing to be executed by the extracted image processing module 38, into tasks corresponding to the divided image data parts respectively.

In a next step 126, the division portion 60 determines whether the image processing of the extracted image processing module 38 is image processing having sequentiality or not. As described above, sequentiality information is held by the image processing module 38 in the present exemplary embodiment. Therefore, the division portion 60 determines the present step with reference to the sequentiality information held by the image processing module 38. In a case of the image processing having no sequentiality, the determination of the step S126 is a negative determination. Then, the division portion 60 advances to a step 130. On the other hand, in a case of the image processing having sequentiality, the determination of the step 126 is a positive determination. Then, the division portion 60 advances to a step 128.

In the step 128, the division portion 60 gives a dependent relation expressing a processing sequence to each of the tasks inside the extracted image processing module 38.

In the next step 130, the division portion 60 determines whether an image processing module 38 is connected to a front stage of the extracted image processing module 38 or not. When the image processing module 38 is not connected, the determination of the step 130 is a negative determination. Then, the division portion 60 advances to a step 134. On the other hand, in the case where the image processing module 38 is connected, the determination of the step 130 is a positive determination. Then, the division portion 60 advances to a step 132.

In the step 132, the division portion 60 gives dependent relations between tasks of the image processing module 38 connected in the front stage and the tasks of the extracted image processing module 38 in accordance with the kind of the image processing executed by the extracted image processing module 38, as described above.

In the next step 134, the division portion 60 determines whether all the image processing modules have been extracted or not in the aforementioned step 122. When there is any image processing module 38 which has not been extracted yet, the determination of the step 134 is a negative determination. Then, the division portion 60 returns to the step 122, in which a next sequential image processing module 38 from top to bottom is extracted as a processing target. Then, the processings of the aforementioned steps 124 to 134 are repeated. On the other hand, when all the image processing modules 38 have been extracted, the determination of the step 134 is a positive determination. Then, the present DAG update processing is completed. Since the DAG update processing in the present exemplary embodiment is executed thus, an image processing DAG 50B is generated.

Figure 8:
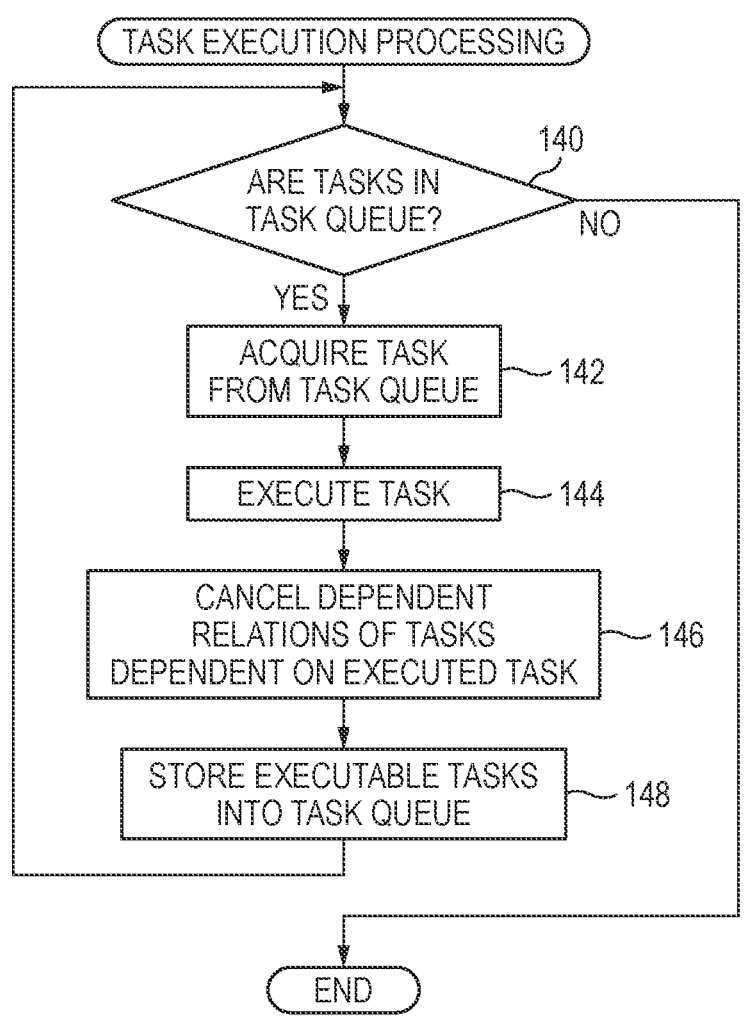
FIG. 8 is a flow chart showing an example of a flow of task execution processing in the first exemplary embodiment.

On the other hand, FIG. 8 is a flow chart showing a flow of processing of a task execution processing program executed by the computing device when an instruction to start execution of image processing has been inputted by the application 32. In addition, the task execution processing program is also installed in advance into the storage portion 20. In addition, the cores 13 which can execute tasks execute the task execution processing program to thereby function as the control portion 62.

In a step 140 in FIG. 8, the control portion 62 determines whether tasks have been stored in the task queue 64 or not. When, for example, execution of all the tasks of the all the image processing modules 38 has been completed, no task is stored in the task queue 64. Therefore, the determination of the step 140 is a negative determination. Then, the present task execution processing is completed. Since the present task execution processing is completed, a result of the image processing desired by the application 32 can be obtained from the output portion 66.

On the other hand, when the tasks are stored in the task queue 64, the determination of the step 140 is a positive determination. Then, the control portion 62 advances to a step 142.

In the step 142, the control portion 62 extracts one task from the task queue 64 from top to bottom. In a next step 144, the control portion 62 instructs one of the cores 13 of the first computing portion 12A or the second computing portion 12B to execute the extracted task. Incidentally, when the task is instructed to be executed by the second computing portion 12B, the core 13 of the first computing portion 12A performs processing of allowing the second computing portion 12B to execute the task. Thus, the task is executed by the second computing portion 12B.

Incidentally, predetermined pre-processing such as processing of securing an output buffer area for storing the result of the image processing or securing computation resources of initialization etc. of variables for the image processing may be performed prior to execution of the task, e.g. prior to the step 144. In addition, predetermined post-processing of releasing the secured computation resources, etc. may be performed after the execution of the task, e.g. after the step 144.

In a next step 146, the control portion 62 cancels a dependent relation of a task dependent on the task which has been already executed by the processing of the step 144.

In a next step 148, the control portion 62 sequentially stores tasks newly executable based on dependent relations into the task queue 64. Then, the control portion 62 returns to the step 140.

Figure 9:
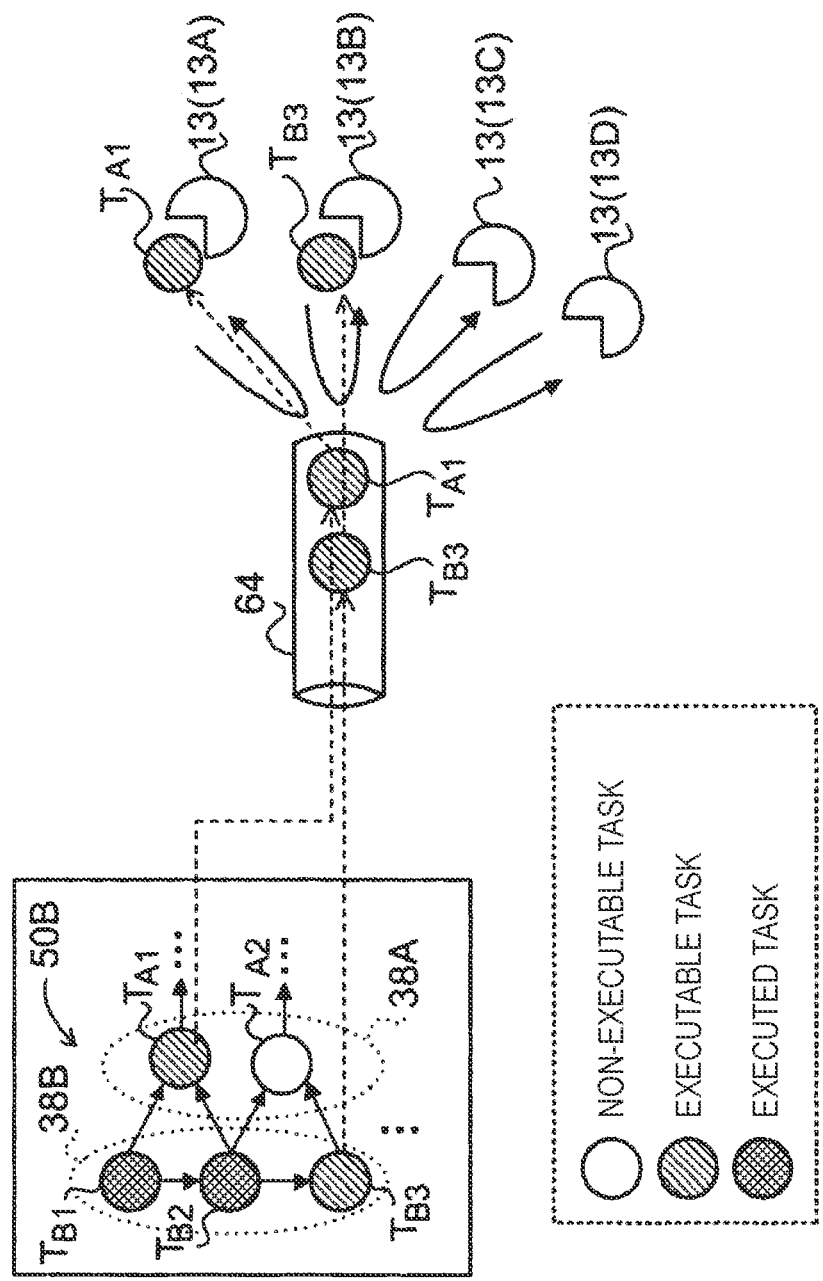
FIG. 9 is a schematic view provided for explanation of the task execution processing in the first exemplary embodiment.

For example, in an image processing DAG 50B shown in FIG. 9, a dependent relation starting at a task $T_{B1}$ and ending at a task $T_{B3}$ is given to the tasks $T_{B1}$ to $T_{B3}$ of an image processing module 38B performing image processing having sequentiality. In addition, dependent relations with the tasks $T_{B1}$ to $T_{B3}$ of the image processing module 38B in a front stage are respectively given to tasks $T_{A1}$ and $T_{A2}$ of an image processing module 38A performing image processing having no sequentiality.

In a case where the task $T_{B1}$ and the task $T_{B2}$ have been executed in the step 144 of the task execution processing, dependent relations between the task $T_{B1}$ and the tasks $T_{B2}$ and $T_{A1}$, and dependent relations between the task $T_{B2}$ and the tasks $T_{B3}$, $T_{A1}$ and $T_{A2}$ are cancelled in the step 146.

Therefore, as shown in FIG. 9, the task $T_{B3}$ and the task $T_{A1}$ can be executed, and are stored individually in the task queue 64 in the step 148.

Therefore, cores 13 (a core 13A and a core 13B in an example shown in FIG. 9) which can execute tasks extract the tasks (the task $T_{B3}$ and the task $T_{A1}$) from the task queue 64 and execute the tasks. That is, as shown in FIG. 9, the task $T_{B3}$ of the image processing module 38B performing the image processing having sequentiality and the task $T_{A1}$ of the image processing module 38A performing the image processing having no sequentiality are executed in parallel by the plurality of cores 13.

Figure 10A:
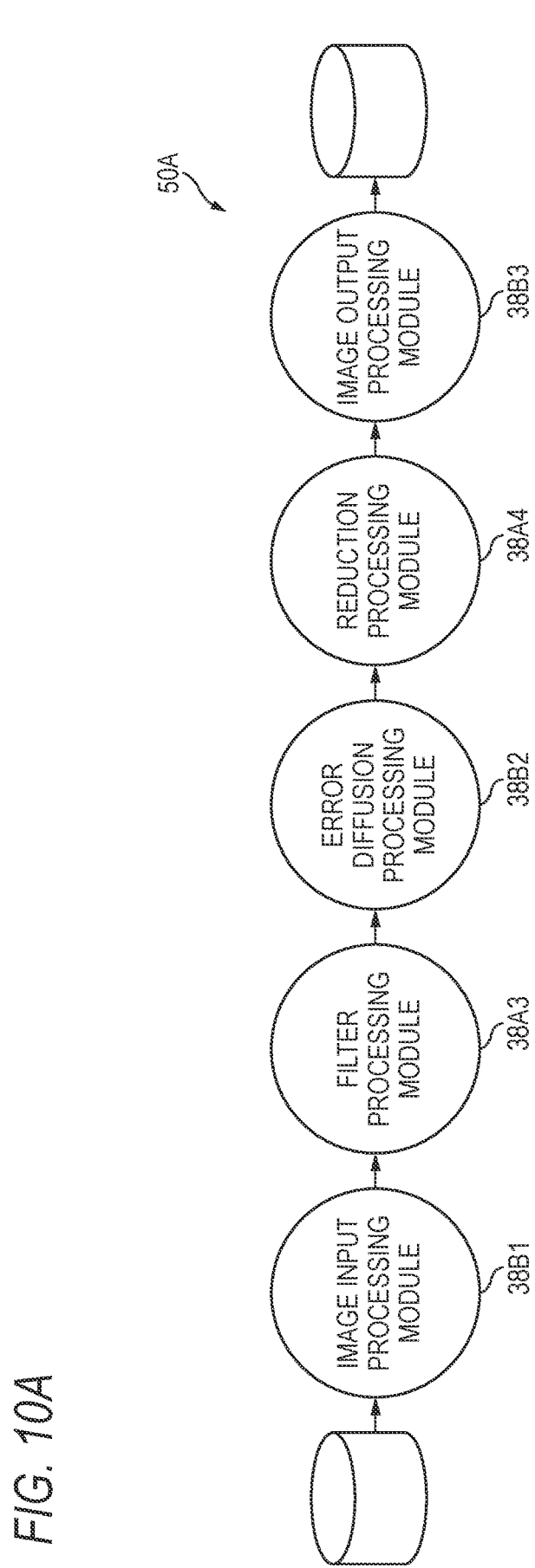
FIG. 10A is a schematic view provided for explanation of effects in the first exemplary embodiment.
Figures 10B, 10C:
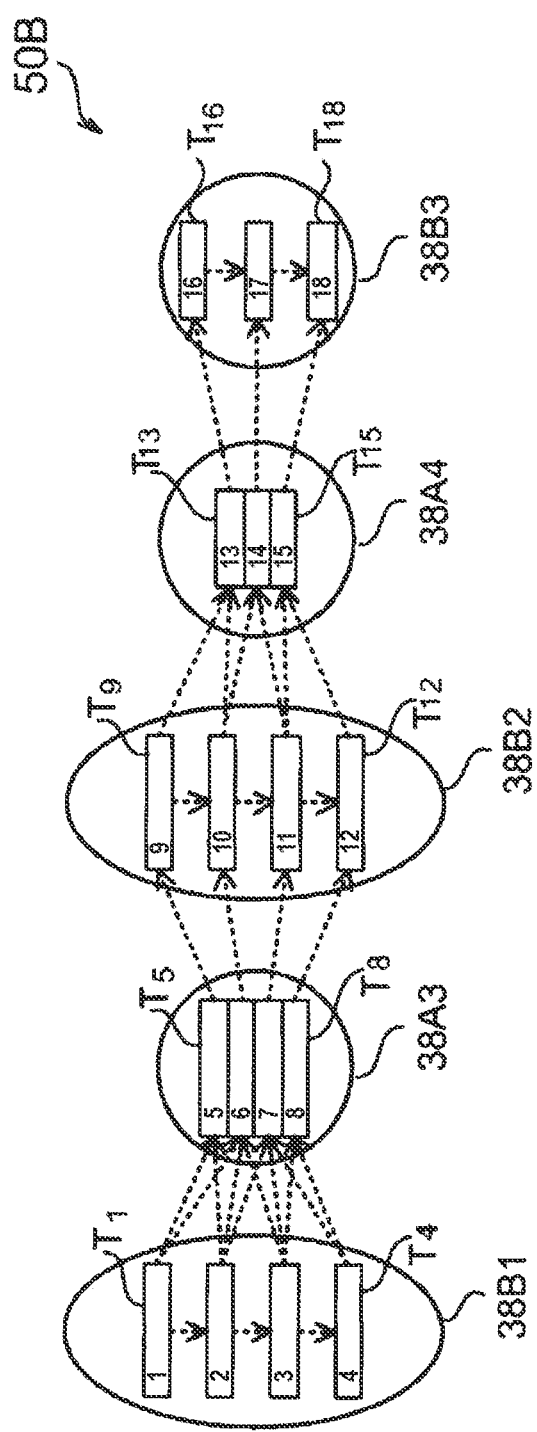
FIG. 10B is a schematic view provided for explanation of the effects in the first exemplary embodiment.
FIG. 10C is a schematic view provided for explanation of the effects in the first exemplary embodiment.

Further, effects of the computer 10 in the present exemplary embodiment will be described specifically with reference to FIG. 10 (FIGS. 10A to 10C). For example, description will be given to a case where the image processing DAG 50A is a DAG in which an image processing module 38B1 performing image input processing, an image processing module 38A3 performing filter processing, an image processing module 38B2 performing error diffusion processing, an image processing module 38A4 performing reduction processing, and an image processing module 38B3 performing image output processing are connected to one another, as shown in FIG. 10A. Incidentally, the image processing modules 38B1, 38B2 and 38B3 are image processing modules 38 each performing image processing having sequentiality, and the image processing modules 38A3 and 38A4 are image processing modules 38 each performing image processing having no sequentiality.

FIG. 10B shows an example of the image processing DAG 50B updated by the division portion 60, which divides the image processing DAG 50A shown in FIG. 10A into partial processings and gives dependencies to the partial processings. The whole of the image processing DAG 50B is divided into eighteen tasks ($T_1$ to $T_{18}$), as shown in FIG. 10B. Specifically, the image processing module 38B1 is divided into the tasks $T_1$ to $T_4$, and a dependent relation according to a processing sequence (sequence from 1 toward 4) among the tasks is given to the tasks $T_1$ to $T_4$. The image processing module 38A3 is divided into the tasks $T_5$ to $T_8$, and dependent relations with the tasks ($T_1$ to $T_4$) of the image processing module 38B1 in a front stage and with the tasks ($T_9$ to $T_{12}$) of the image processing module 38B2 in a rear stage are given to the tasks $T_5$ to $T_8$. In addition, the image processing module 38B2 is divided into the tasks $T_9$ to $T_{12}$, and a dependent relation according to a processing sequence (sequence from 9 toward 12) among the tasks, and dependent relations with the tasks ($T_5$ to $T_8$) of the image processing module 38A3 in the front stage and with the tasks ($T_{13}$ to $T_{15}$) of the image processing module 38A4 in the rear stage are given to the tasks $T_9$ to $T_{12}$. In addition, the image processing module 38A4 is divided into the tasks $T_{13}$ to $T_{15}$, and dependent relations with the tasks ($T_9$ to $T_{12}$) of the image processing module 38B2 in the front stage and with the tasks ($T_{16}$ to $T_{18}$) of the image processing module 38B3 in the rear stage are given to the tasks $T_{13}$ to $T_{15}$. Further, the image processing module 38B3 is divided into the tasks $T_{16}$ to $T_{18}$, and a dependent relation according to a processing sequence (sequence from 16 toward 18) among the tasks, and dependent relations with the tasks ($T_{13}$ to $T_{15}$) of the image processing module 38A4 in the front stage are given to the tasks $T_{16}$ to $T_{18}$.

FIG. 10C shows an example of a flow of processing of the tasks executed by four cores 13A to 13D in a case where the tasks $T_1$ to $T_{18}$ shown in FIG. 10B are processed in parallel by the cores 13A to 13D. Incidentally, a case where it is assumed that it takes equal time to process each of all the tasks is shown in FIG. 10C for convenience of explanation. A processing time in which tasks are executed in parallel by a plurality of cores 13 is elongated, and a processing time in which tasks are executed by one core 13 is shortened.

Incidentally, information about a position indicating how far an image file has been read and information about a position indicating how far an image file has been written have to be delivered among the tasks in image input processing and image output processing, and error information etc. propagated from each processed pixel has to be delivered among the tasks in error diffusion processing. However, these pieces of information are, for example, stored in advance in the image processing modules 38 which are generation sources of the tasks so that these pieces of information can be delivered among the tasks. In addition, each of the dependent relations of the processing sequences is given so that the tasks can be guaranteed not to be processed in parallel. Accordingly, these pieces of information can be read/written without exclusive control.

Figures 11A, 11B:
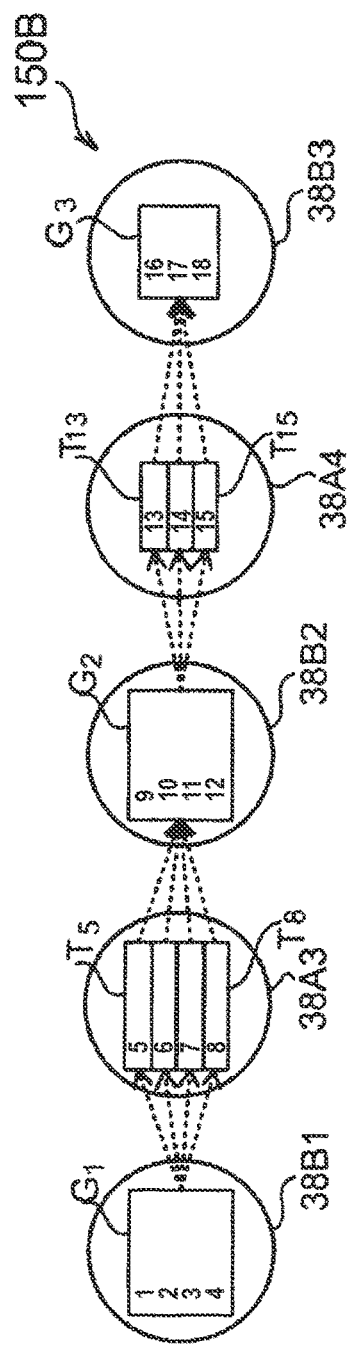
FIG. 11A is a schematic view provided for explanation of effects in a comparative example.
FIG. 11B is a schematic view provided for explanation of the effects in the comparative example.

On the other hand, in a case of a comparative example in which each of image processings having sequentiality cannot be divided into partial processings differently from the present exemplary embodiment, an image processing DAG 50A is updated to an image processing DAG 150B in which three image processings ($G_1$ to $G_3$) with respect to the whole of an image and seven tasks ($T_5$ to $T_8$ and $T_{13}$ to $T_{15}$) are included, as shown in FIG. 11A. The image processing $G_1$ corresponds to the aforementioned tasks $T_1$ to $T_4$, the image processing $G_2$ corresponds to the aforementioned tasks $T_9$ to $T_{12}$, and the image processing $G_3$ corresponds to the aforementioned tasks $T_{16}$ to $T_{18}$.

An example of a flow of processing the tasks executed by four cores 13A to 13D when the image processings $G_1$ to $G_3$, the tasks $T_5$ to $T_8$ and the tasks $T_{13}$ to $T_{15}$ shown in FIG. 11A are processed in parallel by the cores 13A to 13D is shown in FIG. 11B. Incidentally, a case where times required for processing the tasks are assumed to be all equal is also shown in FIG. 11B for convenience of explanation. It is known that a processing time in which tasks are processed in parallel by the cores 13 in the form of the comparative example shown in FIG. 11B is shorter than that in the case of the present exemplary embodiment (refer to FIG. 10C).

Incidentally, in the case of the comparative example, a memory (so-called plane memory) corresponding to the whole of the image is required in each of the image processings $G_1$ to $G_3$. On the other hand, according to the computer 10 in the present exemplary embodiment, such a plane memory is not required. In the case where, for example, processing is performed as shown in FIG. 10C, the memory required for processing the task $T_9$ can be released as long as processing of the task T13 is completed. Accordingly, usage efficiency of the memory may be also improved.

Second Exemplary Embodiment

The present exemplary embodiment will be described below in detail with reference to the drawings.

The gist about configuration and operation similar to or the same as those in the aforementioned first exemplary embodiment will be described while detailed description thereof will be omitted.

The configuration of a computer 10 in the present exemplary embodiment is similar to or the same as the configuration (refer to FIG. 1 and FIG. 3) of the computer 10 in the first exemplary embodiment, but a part of the function of a division portion 60 is different from that in the first exemplary embodiment.

Figure 12:
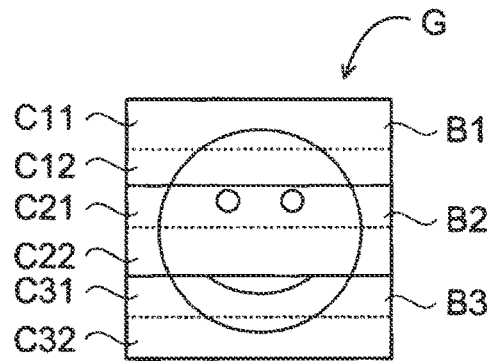
FIG. 12 is a schematic view provided for explanation of an example of division processing of an input image in a second exemplary embodiment.

The division portion 60 in the present exemplary embodiment has a function of subdividing each of divided images (divided image data parts) into which an image to be subjected to image processing having no sequentiality has been divided, into a plurality of divided images (divided image data parts which will be hereinafter referred to as "subdivided image data parts"), in addition to the function provided by the division portion 60 in the first exemplary embodiment. For example, as shown in FIG. 12, the division portion 60 subdivides divided images B1 to B3 into a plurality of (two for each, six in total in an example shown in FIG. 12) subdivided images C11 to C32 in accordance with a predetermined size.

In other words, in division into tasks in the image to be subjected to the image processing having no sequentiality, the division portion 60 in the present exemplary embodiment once divides the image processing into medium grain tasks, sets a dependent relation among the medium grain tasks, and then stores the medium grain tasks into a task queue 64. Before the medium grain tasks are extracted from the task queue 64 and executed, the medium grain tasks are subdivided into fine grain tasks each having a predetermined size, and processed in parallel by a plurality of cores 13.

Each of the fine grain tasks in the present exemplary embodiment is an example of third partial processing in the present disclosure, and a divided image data part of the fine grain task is an example of a third divided image data part in the present disclosure.

Incidentally, the predetermined size for subdividing the tasks may be any size as long as the size is smaller than the size of the aforementioned medium grain task. In the present exemplary embodiment, for example, the size of the medium grain task is set to be not larger than the capacity of a high-speed and small-capacity cache memory, i.e. so-called L1 (Level 1) cache or L2 (Level 2) cache, which is closer to the processor that executes the image processing of the image processing module 38.

On the other hand, effects of the computer 10 in the present exemplary embodiment about DAG construction processing (see FIG. 6) and DAG update processing (see FIG. 7) are similar to or the same as those in the first exemplary embodiment. On the other hand, task execution processing includes processing different from the task execution processing in the first exemplary embodiment (see FIG. 8). Therefore, the task execution processing in the present exemplary embodiment will be described below.

Figure 13:
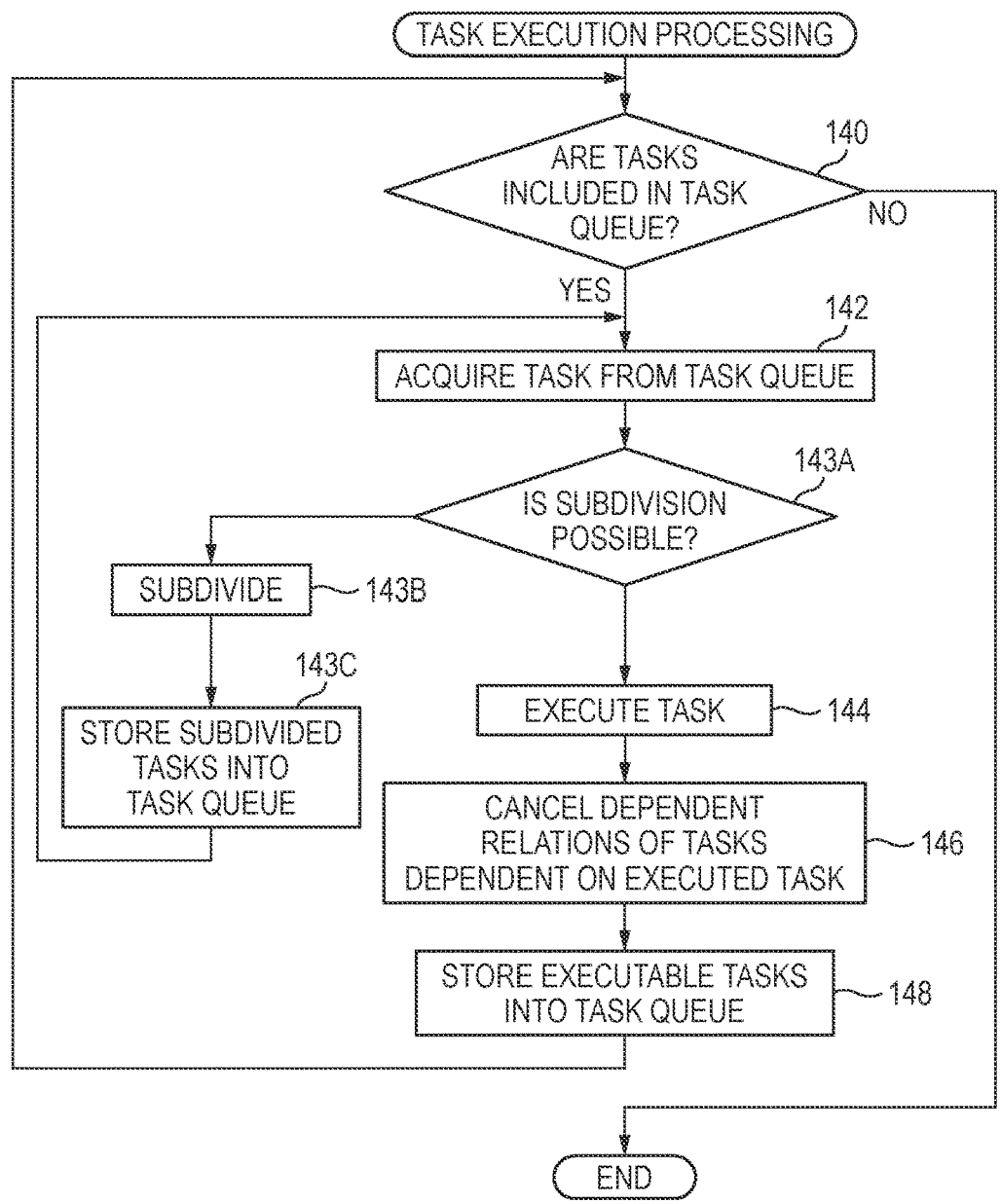
FIG. 13 is a flow chart showing an example of a flow of task execution processing in the second exemplary embodiment.

FIG. 13 is a flow chart showing an example of a flow of the task execution processing in the present exemplary embodiment. As shown in FIG. 13, the task execution processing in the present exemplary embodiment is different from the task execution processing in the first exemplary embodiment at a point that processings of steps 143A to 143C are included between a step 142 and a step 144.

In the present exemplary embodiment, when a control portion 62 acquires a task from the task queue 64 in the step 142, the division portion 60 determines whether subdivision is possible or not in the next step 143A.

In the present exemplary embodiment, when the size of image data (a divided image data piece or a subdivided image data piece) corresponding to the task acquired in the step 142 is not larger than the aforementioned predetermined size, i.e. when the task which has already been subdivided is acquired, subdivision is impossible.

In addition, for example, a task in which image processing is executed by a second computing portion 12B may be prohibited from being subdivided by the division portion 60. In the case where the task is performed by the second computing portion 12B, processing added as an overhead, such as transfer of image data to a local memory 15 or activation of the second computing portion 12B, is larger than that in the case where the task is executed by a first computing portion 12A. The overhead is generated every task. Therefore, when the task is subdivided, overheads increase correspondingly to an increase of the number of tasks. Therefore, the task in which the second computing portion 12B executes image processing may be not subdivided but the image processing is executed directly on the medium grain task. Incidentally, information indicating whether the task should be executed by the second computing portion 12B or not may be given when a processing construction portion 42 generates an image processing DAG 50B from an image processing DAG 50A.

When the task cannot be subdivided, the determination of the step 143A is a negative determination. Then, the flow advances to the step 144. On the other hand, when the task can be subdivided, the determination of the step 143A is a positive determination. Then, the flow advances to the step 143B.

In the step 143B, the division portion 60 subdivides the task into fine grain tasks by the aforementioned predetermined size.

In the next step 143C, the control portion 62 stores all the fine grain tasks obtained by the subdivision into the task queue 64. Then, the control portion 62 returns to the step 142.

Thus, according to the computer 10 in the present exemplary embodiment, medium grain tasks into which an image to be subjected to image processing having sequentiality, and fine grain tasks into which an image to be subjected to image processing having no sequentiality is divided and then further subdivided are executed in parallel by a plurality of computing devices.

Thus, according to the computer 10 in the present exemplary embodiment, the fine grain tasks into which each of the medium grain tasks is subdivided are executed so that an operating rate of the cores 13 or the second computing portion 12B is improved. At the same time, a necessary data quantity is suppressed from being increased so that cache mishit may be prevented from easily occurring.

Accordingly, according to the computer 10 in the present exemplary embodiment, processing efficiency of image processings, i.e. parallel processing in which so-called scalability is enhanced, may be achieved.

As described above, the computer 10 in each of the aforementioned exemplary embodiments is a computer 10 in which image processing is executed by each of image processing modules 38 of an image processing module 38 group in which the image processing modules 38 each executing the image processing are connected to one another in a DAG form. The computer 10 is provided with a division portion 60 and a control portion 62. The division portion 60 divides image data, which is a target of the image processing, into a plurality of divided image data pieces in a case where the image processing is processing having sequentiality in processing sequence. The control portion 62 makes control to enable a plurality of cores 13 to execute tasks (partial processings 39) in parallel. The tasks are pieces of the image processing respectively performed on the divided image data pieces divided by the division portion 60. The tasks are allowed to be processed in accordance with dependent relations with front and rear stages and a processing sequence dependent relation.

According to the aforementioned configuration, the image processing can be divided and handled as partial processings by the computer 10 in the present exemplary embodiment also when the image processing is processing having sequentiality in processing sequence. Therefore, according to the computer 10, a processing time in which the plurality of cores 13 (computing devices) are enabled to execute the tasks in parallel may be relatively elongated.

Accordingly, according to the computer 10 in each of the aforementioned exemplary embodiment, a total image processing time of the image processing DAG 50 (the image processing module 38 group) may be shortened in comparison with that in the case where the image processings having sequentiality in processing sequence are handled as one task.

In addition, according to the computer 10 in the present exemplary embodiment, the image processing is handled as the partial processings in the aforementioned manner. Thus, a so-called plane memory is dispensed with in the image processing, as described above. Accordingly, usage efficiency of the memory may be improved.

Incidentally, each of the aforementioned exemplary embodiments has been described in the case where the second computing portion 12B is provided inside the computer 10. However, the second computing portion 12B may be provided outside the computer 10 or may be provided in another computer different from the computer 10. In addition, the second computing portion 12B may be dispensed with.

In addition, a state in which various programs have been stored (installed) in advance in the storage portion 20 has been described in each of the aforementioned exemplary embodiments. However, the present invention is not limited thereto. The various programs may be provided in a form where the various programs are recorded in a recording medium such as a CD-ROM, a DVD-ROM (Digital Versatile Disk Read Only Memory), or a USB (Universal Serial Bus) memory. In addition, the various programs may be provided in a form in which the various programs can be downloaded from an external device through a network.

The present invention has been described in detail or with reference to specific embodiments. However, it is obvious to those skilled in the art that various changes or modifications can be added to the present invention without departing from the spirit and scope of the present invention.

The present application is based on Patent Application No. 2017-177465 which is a Japanese patent application filed on Sep. 15, 2017, and the contents of which are incorporated hereinafter by reference.

REFERENCE SIGNS LIST

10 computer
12A first computing portion
12B second computing portion
13, 13A to 13D core
14 memory
15 local memory
16 display portion
18 operating portion
20 storage portion
22 image data supply portion
24 image output portion
26 bus
30 operating system
32 application program group (application programs)
34 image processing program group
36 module library
38, 38A1 to 38A4, 38B, 38B1 to 38B3 image processing module
39, 39A to 39F partial processing
40 buffer module
42 processing constructing portion
46 processing control portion
50A, 50B image processing DAG
60 division portion
62 control portion
64 task queue
66 output portion
B1 to B3 divided image
C11, C12, C21, C22, C31, C32 subdivided image
G image, $G_1$ to $G_3$ image processing
$T_{A1}$, $T_{A2}$, $T_{B1}$ to $T_{B3}$ task

The invention claimed is:

1. An image processing apparatus in which image processing is executed by each of objects of an object group in which the objects each executing the image processing are connected to one another in a directed acyclic graph form, the apparatus comprising:
a division portion that divides an image represented by image data, which is a target of the image processing, into a plurality of first divided images that are partial regions of the image represented by the image data by dividing the image data by a size not larger than capacity of a cache memory belonging to a computing portion executing the image processing using image processing modules when the image processing is error diffusion processing; and
a control portion that makes control to enable computing devices to execute first partial processings in parallel, the first partial processings being pieces of the image processing to be performed on the first divided images and being allowed to be processed in accordance with dependent relations with front and rear stages and a processing sequence dependent relation.

2. The image processing apparatus according to claim 1, wherein:
the division portion divides the image represented by the image data, which is a target of the image processing, into a plurality of second divided images when the image processing is image processing independent for each pixel; and
the control portion makes control to enable the computing devices to execute second partial processings and the first partial processings in parallel, the second partial processings being pieces of the image processing to be performed on the second divided images and being allowed to be processed in accordance with dependent relations with the front and rear stages.

3. The image processing apparatus according to claim 2, wherein:
the division portion subdivides each of the second divided images corresponding to the second partial processings into third divided images; and
the control portion makes control to enable the computing devices to execute third partial processings and the first partial processings in parallel, the third partial processings being pieces of the image processing to be performed on the third divided images.

4. The image processing apparatus according to claim 3, wherein:
each of the objects outputs information expressing whether the image processing to be executed is error diffusion processing or image processing independent for each pixel.

5. The image processing apparatus according to claim 4, wherein:
the division portion gives dependent relations according to the processing sequence, to the first partial processings on the first divided images, based on the information outputted by the objects and expressing whether the image processing is error diffusion processing or image processing independent for each pixel.

6. The image processing apparatus according to claim 3, wherein:
each of the objects holds information expressing whether the image processing to be executed is error diffusion processing or image processing independent for each pixel.

7. The image processing apparatus according to claim 6, wherein:
the division portion acquires the information held by the objects and expressing whether the image processing is error diffusion processing or image processing independent for each pixel, and gives dependent relations according to the processing sequence, to the first partial processings on the first divided images based on the acquired information.

8. The image processing apparatus according to claim 3, wherein:
the dependent relations with the front and rear stages are dependent relations between partial processings belonging to corresponding image processing and partial processings belonging to image processings in the front and rear stages, and the processing sequence dependent relation is a processing sequence dependent relation among the partial processings belonging to the corresponding image processing.

9. The image processing apparatus according to claim 2, wherein:
each of the objects outputs information expressing whether the image processing to be executed is error diffusion processing or image processing independent for each pixel.

10. The image processing apparatus according to claim 9, wherein:
the division portion gives dependent relations according to the processing sequence, to the first partial processings on the first divided images, based on the information outputted by the objects and expressing whether the image processing is error diffusion processing or image processing independent for each pixel.

11. The image processing apparatus according to claim 2, wherein:
each of the objects holds information expressing whether the image processing to be executed is error diffusion processing or image processing independent for each pixel.

12. The image processing apparatus according to claim 11, wherein:
the division portion acquires the information held by the objects and expressing whether the image processing is error diffusion processing or image processing independent for each pixel, and gives dependent relations according to the processing sequence, to the first partial processings on the first divided images based on the acquired information.

13. The image processing apparatus according to claim 2, wherein:
the dependent relations with the front and rear stages are dependent relations between partial processings belonging to corresponding image processing and partial processings belonging to image processings in the front and rear stages, and the processing sequence dependent relation is a processing sequence dependent relation among the partial processings belonging to the corresponding image processing.

14. The image processing apparatus according to claim 1, wherein:
each of the objects outputs information expressing whether the image processing to be executed is error diffusion processing or image processing independent for each pixel.

15. The image processing apparatus according to claim 14, wherein:
the division portion gives dependent relations according to the processing sequence, to the first partial processings on the first divided images, based on the information outputted by the objects and expressing whether the image processing is error diffusion processing or image processing independent for each pixel.

16. The image processing apparatus according to claim 1, wherein:
each of the objects holds information expressing whether the image processing to be executed is error diffusion processing or image processing independent for each pixel.

17. The image processing apparatus according to claim 16, wherein:
the division portion acquires the information held by the objects and expressing whether the image processing is error diffusion processing or image processing independent for each pixel, and gives dependent relations according to the processing sequence, to the first partial processings on the first divided images based on the acquired information.

18. The image processing apparatus according to claim 1, wherein:
the dependent relations with the front and rear stages are dependent relations between partial processings belonging to corresponding image processing and partial processings belonging to image processings in the front and rear stages, and the processing sequence dependent relation is a processing sequence dependent relation among the partial processings belonging to the corresponding image processing.

19. A non-transitory computer readable medium storing an image processing program causing a computer to function as the division portion and the control portion of the image processing apparatus according to claim 1.

20. An image processing method performed by an image processing apparatus to execute image processing by each of objects of an object group in which the objects each executing the image processing are connected to one another in a directed acyclic graph form, the method comprising:
dividing image data, which is a target of the image processing, into a plurality of first divided images that are partial regions of the image represented by the image data by dividing the image data by a size not larger than capacity of a cache memory belonging to a computing portion executing the image processing using image processing modules when the image processing is error diffusion processing; and
making control to enable computing devices to execute first partial processings in parallel, the first partial processings being pieces of the image processing to be performed on the first divided images and being allowed to be processed in accordance with dependent relations with front and rear stages and a processing sequence dependent relation.

* * * * *